US011963058B2

(12) United States Patent
Li et al.

(10) Patent No.: US 11,963,058 B2
(45) Date of Patent: Apr. 16, 2024

(54) DUAL ACTIVE PROTOCOL STACK HANDOVERS ABOVE 24 GHZ

(71) Applicant: Apple Inc., Cupertino, CA (US)

(72) Inventors: Qiming Li, Beijing (CN); Chunhai Yao, Beijing (CN); Dawei Zhang, Saratoga, CA (US); Huaning Niu, San Jose, CA (US); Jie Cui, San Jose, CA (US); Manasa Raghavan, Sunnyvale, CA (US); Xiang Chen, Campbell, CA (US); Yang Tang, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 298 days.

(21) Appl. No.: 17/438,179

(22) PCT Filed: May 10, 2021

(86) PCT No.: PCT/CN2021/092578
§ 371 (c)(1),
(2) Date: Sep. 10, 2021

(87) PCT Pub. No.: WO2022/236525
PCT Pub. Date: Nov. 17, 2022

(65) Prior Publication Data
US 2023/0337094 A1 Oct. 19, 2023

(51) Int. Cl.
*H04W 36/18* (2009.01)
*H04W 36/00* (2009.01)

(52) U.S. Cl.
CPC ..... *H04W 36/18* (2013.01); *H04W 36/00725* (2023.05)

(58) Field of Classification Search
None
See application file for complete search history.

(56) References Cited

U.S. PATENT DOCUMENTS

| 2020/0022035 | A1  | 1/2020  | Kadiri |
| 2020/0314714 | A1  | 10/2020 | Jung et al. |
| 2021/0029605 | A1* | 1/2021  | Kadiri .................. H04W 36/18 |

(Continued)

OTHER PUBLICATIONS

Extended European Search Report for EP Patent Application No. 21887868.4; 8 pages; dated Aug. 25, 2022.

(Continued)

*Primary Examiner* — Hong Shao
(74) *Attorney, Agent, or Firm* — Kowert, Hood, Munyon, Rankin & Goetzel, P.C.

(57) ABSTRACT

Apparatuses, systems, and methods for performing dual active protocol stack handovers in a frequency range above 24 GHz. A UE may transmit an indication to a base station indicating a dual active protocol stack (DAPS) handover capability of the UE corresponding to a frequency range (FR) above 24 GHz. The UE may receive, from a target cell of the one or more cells, a command to perform a DAPS handover from a source cell to the target cell. While performing the DAPS handover and maintaining a data connection with the source cell, the UE may perform measurements on the target cell followed by a physical random access channel (PRACH) procedure. The UE may then receive a source cell release command from the target cell and release the data connection with the source cell.

20 Claims, 6 Drawing Sheets

(56) References Cited

U.S. PATENT DOCUMENTS

| | | | |
|---|---|---|---|
| 2021/0068021 A1 | 3/2021 | Awoniyi-Oteri et al. | |
| 2021/0105671 A1 | 4/2021 | Van Der Velde | |
| 2021/0105674 A1 | 4/2021 | Kim | |
| 2023/0269646 A1* | 8/2023 | Dudda | H04W 36/18 370/331 |
| 2023/0328830 A1* | 10/2023 | Yi | H04W 76/19 370/329 |

OTHER PUBLICATIONS

International Search Report and Written Opinion for PCT/CN2021/092578; 9 pages; dated Feb. 10, 2022.

ZTE "Discussion on NR Mobility Enhancements in Physical Layer"; 3GPP TSG RAN WG1 Meeting #99 R1-1911975; Reno, USA; 11 pages; Nov. 22, 2019.

Qualcomm Inc "DAPS HO support for simultaneous Tx not feasible scenarios"; 3GPP TSG-RAN WG2 Meeting #107bis R2-1912296; Chongqing, CN; 3 pages; Oct. 18, 2019.

Intel Email discussion summary for [96e][209] NR_Mob_enh_RRM 3GPP TSG-RAN WG4 Meeting #96-3 R4-2012209; 21 pages; Aug. 28, 2020.

* cited by examiner

DUAL ACTIVE PROTOCOL STACK HANDOVERS ABOVE 24 GHZ

FIELD

The present application relates to wireless devices, and more particularly to apparatuses, systems, and methods for a wireless device to perform a dual active protocol stack handover in the frequency range of 24.25 GHz to 52.6 GHz.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods for a wireless device to perform a dual active protocol stack handover in a frequency range of 24.25 GHz to 52.6 GHz.

According to the techniques described herein, a UE may transmit an indication to one or more base stations indicating a dual active protocol stack (DAPS) handover capability of the UE corresponding to a frequency range (FR) above 24 GHz. The UE may receive, from a target cell of the one or more cells, a command to perform a DAPS handover from a source cell to the target cell. Next, while performing the DAPS handover in response to the DAPS handover command and maintaining a data connection with the source cell, the UE may then perform measurements on the target cell followed by a physical random access channel (PRACH) procedure. The UE may then receive, in response to completion of the PRACH procedure, a source cell release command from the target cell. The UE may then, in response to receiving the source cell release command, release the data connection with the source cell.

At least according to some embodiments, the DAPS handover capability may be performed using one or more collocated or non-collocated independent beams of the one or more base stations. In some embodiments, the DAPS handover capability may be performed with a common beam collocated at the one or more base stations.

In some embodiments, the second frequency range may be from 24.25 GHz to 52.6 GHz and the DAPS handover capability may be indicated per band, per band combination, or per band and per band combination.

In some embodiments, the DAPS handover may have one or more corresponding delay times and during inter-band and Intra-band DAPS handovers, the UE may be allowed a first interruption on the source cell during a first delay time and a second interruption during a second delay time.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
TS: Technical Specification
RAN: Radio Access Network
RAT: Radio Access Technology
UE: User Equipment
RF: Radio Frequency
BS: Base Station
DL: Downlink
UL: Uplink
LTE: Long Term Evolution
NR: New Radio
5GS: 5G System
SGMM: 5GS Mobility Management
SGC: 5G Core Network
IE: Information Element
SSB: Synchronization Signal Block
RRM: Radio Resource Management
RLM: Radio Link Management
SMTC: SSB-Based RRM Measurement Timing Configuration
DAPS: Dual Active Protocol Stack
FR: Frequency Range
PRACH: Physical Random Access Channel
IBM: Independent Beam Management
TTI: Transmission Time Interval Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")— any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1:
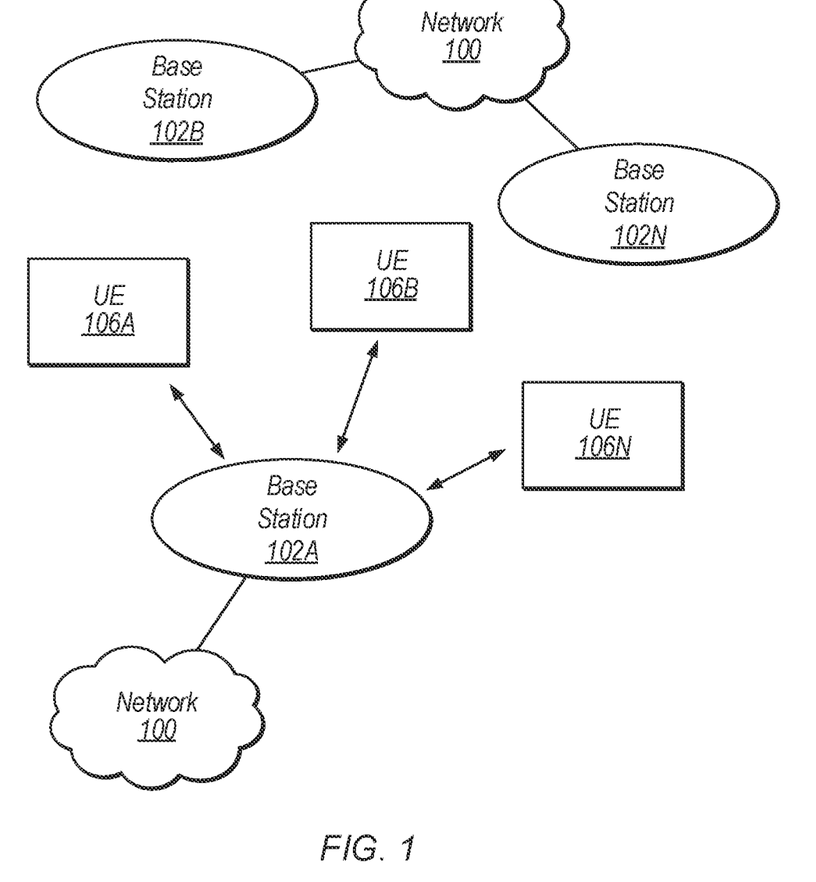
FIG. 1 illustrates an example wireless communication system, according to some embodiments.
Figure 2:
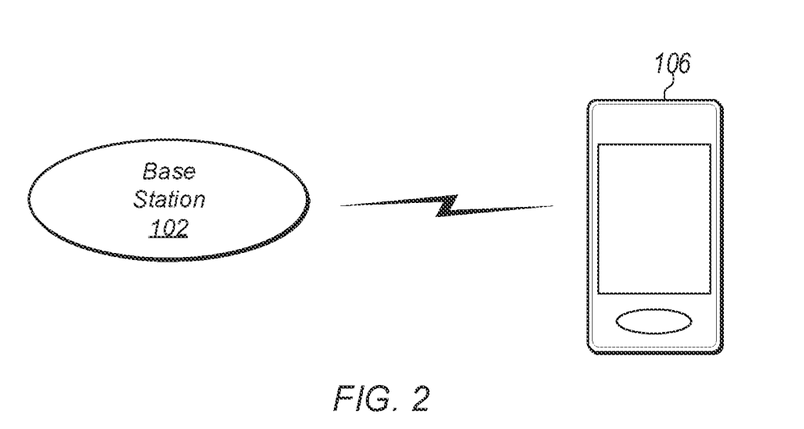
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
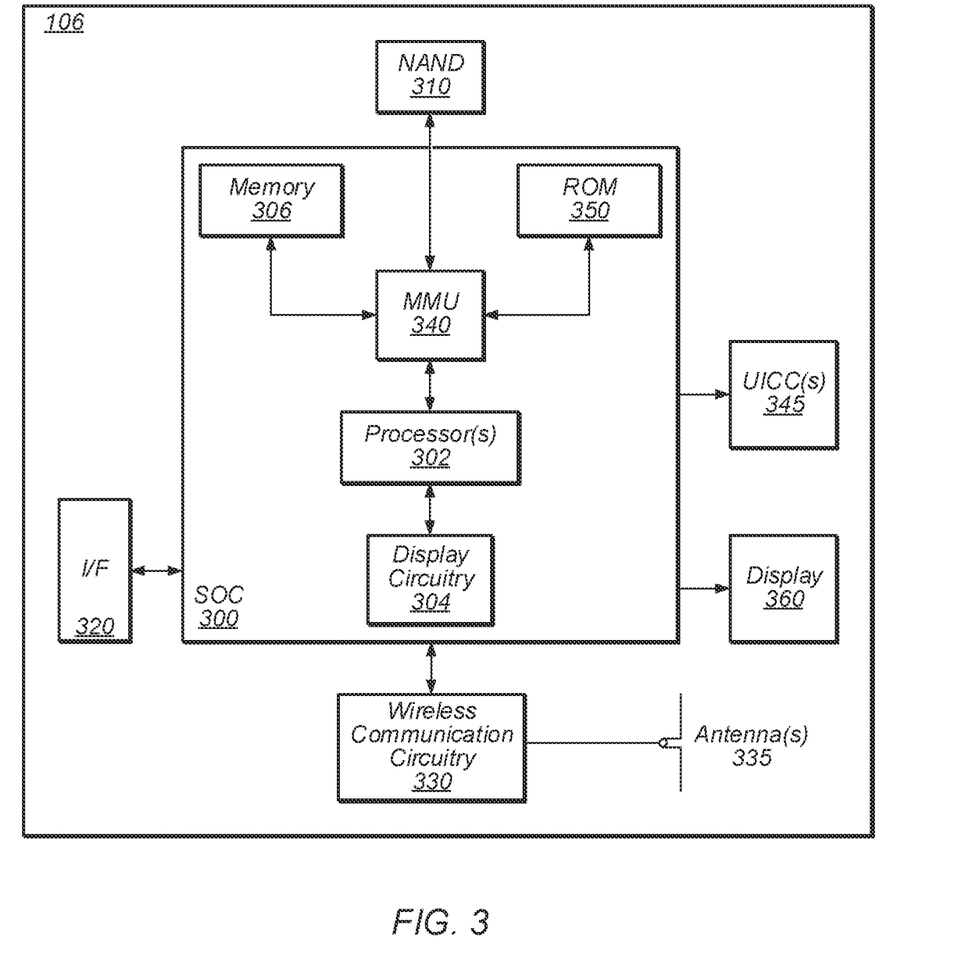
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
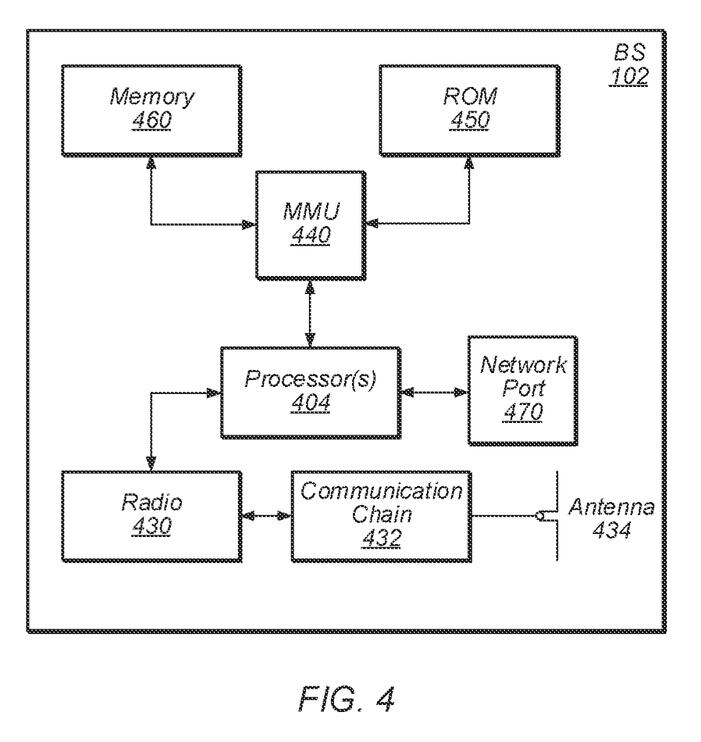
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
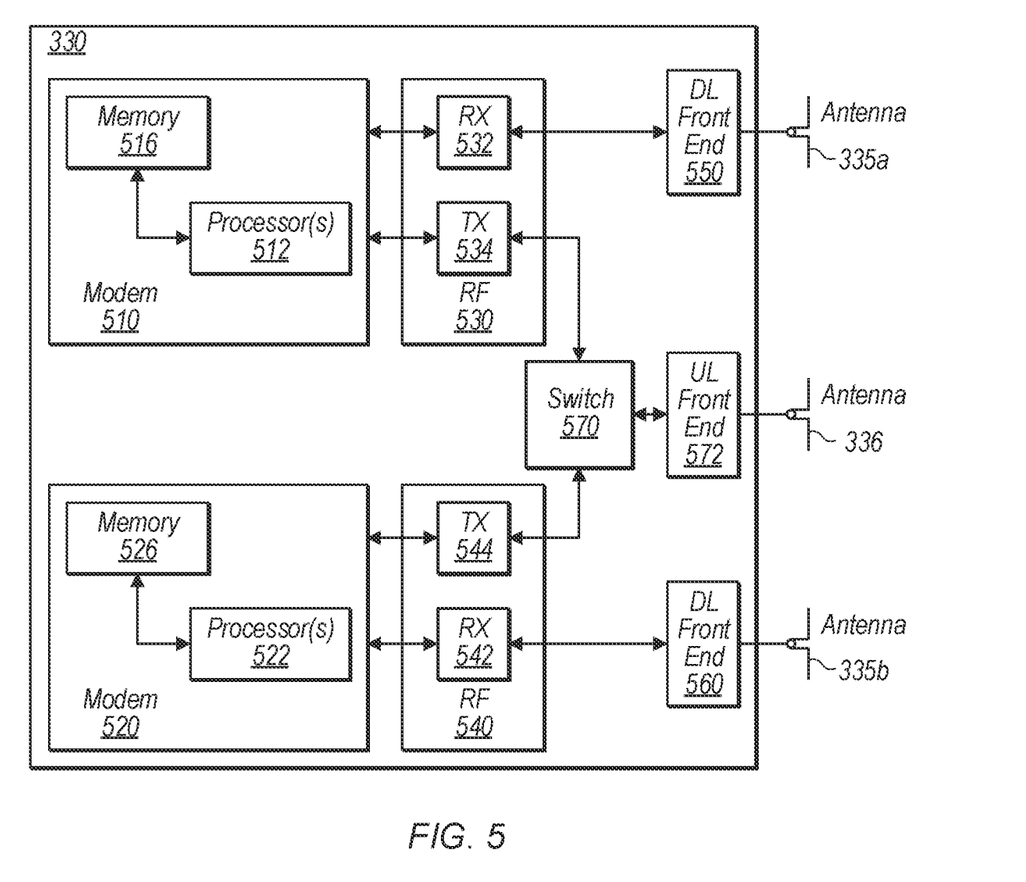
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs)

that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335*b*. As another example, the cellular communication circuitry 330 may not include the modem 510, the RF front end 530, the DL front end 550, and/or the antenna 335*a*. In some embodiments, the cellular communication circuitry 330 may also not include the switch 570, and the RF front end 530 or the RF front end 540 may be in communication, e.g., directly, with the UL front end 572.

Figure 6:
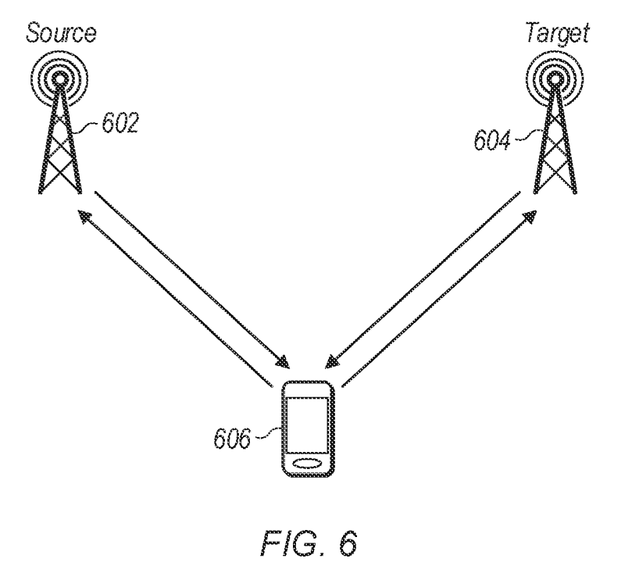
FIG. 6 illustrates aspects of an example possible dual active protocol stack handover, according to some embodiments.

FIG. 6—Dual Active Protocol Stack Handover

In legacy handovers, the UE released the source cell after receiving a handover command and then performed cell search and physical random access procedure (PRACH) for the target cell. However, in this legacy scenario, there was no data transmission between the UE and the network before the PRACH procedure with the target cell was completed. This interruption in data transmission could typically be up to dozens of milliseconds and even hundreds of milliseconds in length in the worst case.

New cellular communication techniques are continually under development, to increase coverage, to better serve the range of demands and use cases, and for a variety of other reasons. One technique is referred to as dual active protocol stack (DAPS) handover. This handover technique may include a wireless device maintaining both uplink and downlink links with both the source cell and the target cell of the handover, e.g., to potentially reduce any potential interruption to service when performing handover. FIG. 6 illustrates aspects of such a possible dual active protocol stack handover. In the illustrated example, a wireless device 606 may keep both uplink and downlink connections with both a source cell 602 and a target cell 604 during the handover operation.

Dual Active Protocol Stack Handover in Frequency Range 2 (FR2)

Dual Active Protocol Stack (DAPS) handovers were introduced in recent New Radio (NR) release mobility enhancement work items to address the long interruption times during handover procedures. In DAPS handovers, the UE may maintain data transmission and reception with the network even after receiving a handover command. The release of the source cell may then be triggered by the target cell, which is possible after a physical random access channel (PRACH) procedure for the target cell is completed. Accordingly, the source cell is released by the UE (e.g., the data connection to the source cell is discarded) only after data connection with target cell is successfully established. Therefore, the data interruption time may be able to be significantly reduced by maintaining dual connectivity until the PRACH with the target cell is complete before releasing the source cell connection. However, under current operations, this procedure is not supported for frequency range 2 (FR2) to FR2 handovers.

Considering non-collocated deployment of source and target cells, it may be desirable for the UE to perform beamforming operations corresponding to beams with different directions in order to perform handovers efficiently. For example, it may be desirable for the UE to be physically directed toward or pointed toward a source cell and a target cell respectively when performing a handover so as to increase transmission and reception signal strength. Accordingly, recent NR releases have provided support for use of independent beam management (IBM). UEs supporting IBM may be able to maintain independent beams on different FR2 bands which may allow for FR2 inter-band DAPS handovers. Furthermore, UEs supporting multiple transmission and reception points (mTRP) may even support multiple beams on the same frequency layer, which may allow for FR2 intra-frequency DAPS handovers.

It may be beneficial to preform DAPS handovers in frequency ranges greater than FR1 (e.g., 24 GHz) and in particular between Frequency Range 2 (FR2) supported cells corresponding to a frequency range of 24.25 GHz to 52.6 GHz. DAPS handovers in this frequency range may allow for even further reduced interruptions times due to the processing times associated with these higher frequencies. Thus, it may be beneficial, at least in some instances, to provide techniques or methods for dual active protocol stack handovers in FR2 such that interruption times are significantly reduced and in effect the user's overall experience is improved. Accordingly, improvements in the field are desired.

Figure 7:
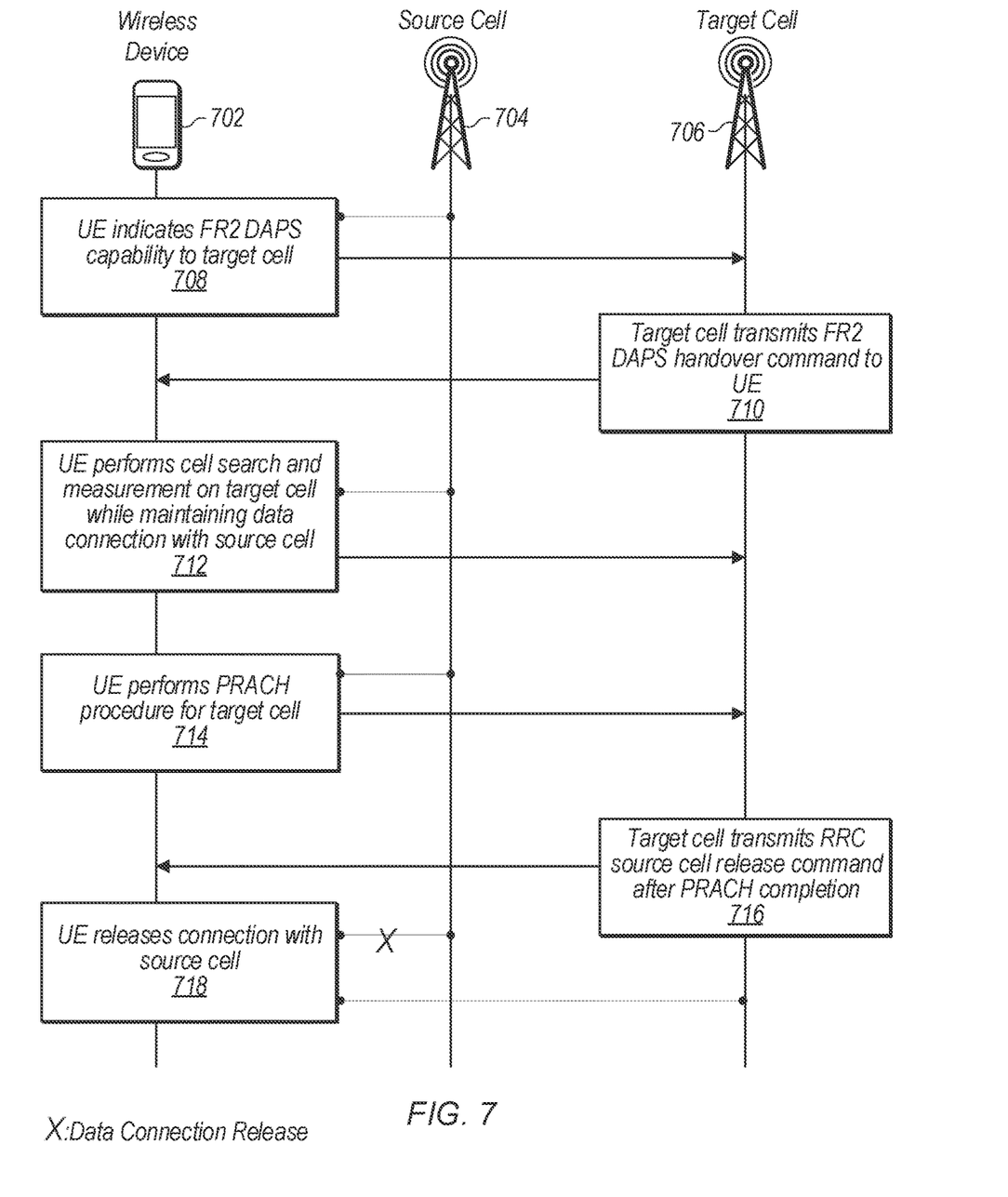
FIG. 7 is a communication flow diagram illustrating aspects of an example method for performing a dual active protocol stack handover from a source cell to a target cell in frequency range 2 (FR2), according to some embodiments.

FIG. 7—Method for DAPS Handover Between FR2 Source and Target Cells

FIG. 7 is a communication flow diagram illustrating example aspects of a method for dual active protocol stack handovers in FR2, at least according to some embodiments. Aspects of the method of FIG. 7 may be implemented by a wireless device 106 (such as a UE 106 illustrated in various of the Figures herein), source cell 602 and/or a target cell 604 (e.g., which may be provided by one or more base stations such as a BS 102 illustrated in various of the Figures herein), and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

It should be noted that while the techniques of FIG. 7 are described primarily in conjunction with DAPS handovers in Frequency Range 2 (FR2), various of the techniques described herein may also or alternatively be applicable in any of various other scenarios, such as in other scenarios in which a wireless device maintains simultaneous active data connections with multiple cells of a cellular network and possibly in different frequency ranges.

In various embodiments, some of the elements of the methods shown may be performed concurrently, in a different order than shown, may be substituted for by other method elements, or may be omitted. Additional elements may also be performed as desired. As shown, the method of FIG. 7 may operate as follows.

In 708, the UE 106 may be connected to a source cell 602 and further indicate its FR2 DAPS capability to one or more FR2 supporting base station(s)/cell(s) such as the target cell 604. For example, in some embodiments the UE may be capable of performing DAPS handovers with multiple independent beams through use of IBM. Additionally, the UE may also indicate the support of DAPS handover in FR2 for collocated and non-collocated beams. In other words, the UE may indicate its capability of performing DAPS handovers with collocated beams (e.g., one or more different beams located at the same base station or cell) and non-collocated beams (e.g., one or more different beams located at different base stations or cells). In some embodiments, the UE may indicate this capability in radio resource control (RRC) signaling.

Moreover, the UE may also indicate its capability to support DAPS handover using a common beam at a collocated base station or cell. In other words, the UE may be capable of performing a DAPS handover from a source cell to a target cell, both collocated at a particular base station, using the same or a common beam. In some embodiments, the UE DAPS handover capabilities may be supported according to a per-band basis, a per-band combination basis, or a per-band and per-band combination basis. In other words, in some embodiments certain UEs may be configured with different architectures associated with certain frequency bands and combinations and therefore may also be configured to support DAPS handovers corresponding to these architectures. For example, a source cell may correspond to frequency band "n12" and a target cell may correspond to frequency band "n14". In order to perform the DAPS handover from the source cell to the target cell, the UE's architecture may need to be configured to support these frequency bands, frequency band combinations, or frequency bands and frequency band combinations.

In response to receiving this capability information in 708, in 710 the target cell 604 may transmit a FR2 handover command to the UE 106. More specifically, the target cell 604 may transmit RRC signaling to the UE 106 acknowledging support of FR2 DAPS handover and further providing a command to the UE 106 that it should proceed with the FR2 DAPS handover from the source cell 602 to the target cell 604. Additionally, the FR2 DAPS handover command may include indicators corresponding to IBM supported DAPS handovers. For example, the FR2 DAPS handover command may include a DAPS handover indicator for multiple independent beams and may further trigger the UE to perform a DAPS handover to a non-collocated target cell (e.g., located at another base station). Furthermore, this triggered non-collocated handover may be applied for both intra-frequency and inter-frequency handovers. In some embodiments, the FR2 DAPS handover command may also include a DAPS handover indicator for a common beam and further trigger the UE to perform a DAPS handover to a collocated target cell (e.g., located at a common base station). Moreover, this triggered co-located handover may also be applied for both intra-frequency and inter-frequency handovers.

In response to receiving the handover command in 710, in 712 the UE 106 may perform cell search and measurement operations on the target cell 604 while maintaining data connection with source cell 602. More specifically, the UE 106 may determine various signal parameters and strengths associated with the target cell 604 as part of radio resource management (RRM) measurements. Additionally, while performing these RRM measurements, the UE 106 may also maintain its data connection with the source cell 602. In doing so, the UE 106 may be able to utilize both uplink and downlink links with both the source cell 602 and the target cell 604 of the handover and thus may potentially reduce any potential interruption to service when performing the handover.

In 714, the UE 106 may perform a physical random access channel (PRACH) procedure for the target cell 604 in order to establish a data connection with the target cell 604. More specifically, the UE 106 may attempt to establish initial access with the target cell 604 in order to acquire uplink and downlink synchronization and obtain certain specified IDs for radio access communication. In other words, the UE 106 may attempt a connection procedure between itself and the target cell 604 (e.g., through a RRC reconfiguration) in order to establish a data connection for uplink and downlink communications. Additionally, as part of the FR2 DAPS handover, the UE 106 may again maintain its data connection with the source cell 602 while performing the PRACH procedure for target cell 604 so as to mitigate interruption times.

In 716, the target cell 604 may transmit a radio resource control (RRC) source cell release command to the UE 106 after the PRACH procedure has been completed between the UE 106 and the target cell 604. In other words, having completed the connection procedure between the UE 106 and target cell 604 (e.g., through the RRC reconfiguration), the target cell 604 may inform the UE 106 that the handover from the source cell 602 to the target cell 604 has been successful. Accordingly, the UE 106 may now be transmitting and receiving uplink and downlink data to and from the target cell 604. Furthermore, the source cell release command transmitted from the target cell 604 to the UE 106 may indicate to the UE that it can now release, discard, or disconnect the source cell 602 data connection.

In 718, the UE 106 may, in response to the source cell 602 release command received from the target cell 604, release its data connection to the source cell 602. For example, having completed its PRACH procedure and successfully connected to the target cell 604, the UE may then disconnect its data connection to that of the source cell 602. In doing so, the UE 106 may now utilize uplink and downlink connections with the target cell 604 (e.g., the UE 106 and target cell 604 are connected) since the DAPS handover has completed. The UE 106 thus releases the source cell 602 after both uplink and downlink communication have completed with the target cell, thereby potentially reducing and possibly eliminating any potential interruption to service in performing the FR2 DAPS handover.

It should be noted, however, that the example details illustrated in and described with respect to FIG. 7 are not intended to be limiting to the disclosure as a whole: numerous variations and alternatives to the details provided herein below are possible and should be considered within the scope of the disclosure.

For example, a UE may transmit an indication to one or more base stations indicating a dual active protocol stack (DAPS) handover capability of the UE in a second frequency range (FR) greater than a first FR. The DAPS handover capability may correspond to a handover from a first cell in the second FR to a second cell in the second FR where the first cell is a source cell and the second cell is a target cell. Next, while performing the DAPS handover and maintaining a data connection with the source cell, the UE may then perform measurements on the target cell followed by a physical random access channel (PRACH) procedure. The UE may then receive, in response to completion of the PRACH procedure, a source cell release command from the target cell.

Thus, the method of FIG. 7 may be used by a wireless device to preform DAPS handovers in frequency ranges greater than FR1 (e.g., 24 GHz) and in particular between Frequency Range 2 (FR2) supported cells corresponding to a frequency range of 24.25 GHz to 52.6 GHz. DAPS handovers in this frequency range may allow for even further reduced interruptions times due to the processing times associated with these higher frequencies. Thus, this method for dual active protocol stack handovers in FR2 may be used such that interruption times are significantly reduced, effectively improving the user's overall experience.

In some embodiments, synchronous DAPS handover in FR2 may be characterized by certain transmit and receive timing conditions. For example, Intra-band FR2 DAPS handovers may be considered synchronous if the maximum receive timing difference between the source cell and target cell is characterized by $t_{max,Rx}^{Intra-band}=0.26+X$ where $t_{max,Rx}^{Intra-band}$ may be expressed in terms of microseconds (μs). Furthermore, Intra-band FR2 DAPS handovers may be considered synchronous if the maximum transmit timing difference between the source cell and target cell is characterized by $t_{max,Tx}^{Intra-band}=0.76+Y$. Additionally, the value X may be characterized as an Intra-band maximum supported inter-site distance (e.g., the physical distance between sites). For example, if the maximum supported inter site distance (ISD) in FR2 is 500 m, then X=500 m/c=1.67 μs. Moreover, in some embodiments, the DAPS handover may be considered as being asynchronous if the maximum receive timing difference is greater than $t_{max,Rx}^{Intra-band}$ or the maximum transmit timing difference is greater than $t_{max,Tx}^{Intra-band}$.

In some embodiments, synchronous DAPS handover in FR2 may also be characterized by certain transmit and receive timing conditions for inter-band FR2 DAPS handovers. For example, the inter-band DAPS handovers in FR2 may be considered synchronous if the maximum receive timing difference between the source cell and target cell is characterized by $t_{max,Rx}^{Intra-band}=8+Y$ where $t_{max,Rx}^{Intra-band}$ may be expressed in terms of microseconds (μs). Furthermore, inter-band FR2 DAPS handovers may be considered synchronous if the maximum transmit timing difference between the source cell and target cell is characterized by $t_{max,Tx}^{Intra-band}=8.5+Y$. Similar to the value X discussed above with regard to Intra-band FR2 DAPS handovers, the value Y may be characterized as an inter-band maximum supported inter-site distance. Moreover, in some embodiments, the DAPS handover may be considered as being asynchronous if the maximum receive timing difference is greater than $t_{max,Rx}^{Intra-band}$ or the maximum transmit timing difference is greater than $t_{max,Tx}^{Intra-band}$.

In some embodiments, FR2 DAPS handovers may include one or more delays. For example, when the UE receives a RRC message indicating handover, the UE (supporting dual active protocol stack handover) may be configured to start the transmission of the new uplink PRACH channel within a certain time period $D_{handover1}$ from the end of the last transmission time interval (TTI) containing the RRC command. In other words, $D_{handover1}$ may be defined as $D_{handover1}=T_{RRC\_procedure}+T_{search}+T_{IU}+T_{processing}+T_\Delta+T_{margin}$ and expressed in units of milliseconds (ms). Accordingly, $T_{RRC\_procedure}$ may be characterized as the RRC procedural delay, $T_{search}$ may be characterized as the time required to search the target cell when the handover command is received by the UE, $T_{IU}$ may be characterized as the interruption uncertainty in acquiring the first available PRACH occasion in the new cell, $T_{processing}$ may be characterized as the time for UE processing and may further have an upper limit of 20 ms (as compared to an upper limit of 40 ms for millimeter wave operations), TA may be characterized as the time for fine time tracking and acquiring full timing information of the target cell, and $T_{margin}$ may be characterized as the synchronization signal block (SSB) post-processing time and may further have an upper limit of approximately 2 ms.

Moreover, after successful RACH procedure of the target cell, when the UE receives an RRC message implying source cell release command, the UE may perform context release actions within a delay timing period corresponding to $D_{handover2}$. Moreover, $D_{handover2}$ may be characterized by $D_{handover2}=T_{RRC\_procedure} T_{interrupt2}$ and expressed in units of milliseconds (ms) where $T_{RRc\_procedure}$ is the RRC procedural delay and $T_{interrupt2}$ may correspond to a maximum interrupt value corresponding to a UE's capability to interrupt a FR2 DAPS handover to a target cell.

In some embodiments, the UE may be capable of performing inter-band FR2 DAPS handover interruption. For example, if the source and target cell are on different carriers, the UE may need additional time to activate the appropriate base band resources corresponding to the different carrier of the target cell. More specifically, during $D_{handover1}$, the UE may be allowed to interrupt the handover on the source cell up to a maximum value of $T_{interrupt1}$. For example, for the case in which the numerology (e.g., subcarrier spacing type) μ=2 and the corresponding NR slot length of the target cell is 0.25 ms, $T_{interrupt1}$ may be characterized by $T_{interrupt1}=4$ for the synchronous case and $T_{interrupt1}=4+x$ for the asynchronous case. In another example in which numerology μ=3 and the corresponding NR slot length of the target cell is 0.125 ms, $T_{interrupt1}$ may be characterized by $T_{interrupt1}=8$ for the synchronous case and $T_{interrupt1}=8+x$ for the asynchronous case. Furthermore, in the asynchronous cases, the value "x" may correspond to an additional interruption time (corresponding to a number of slots) and may typically be a value of 1 slot. However, in some embodiments, "x" may also be a value larger than 1. Moreover, in some embodiments, asynchronous DAPS handovers may include larger interruption times (than that of synchronous DAPS handovers) due to partial overlap of frames.

In some embodiments, the UE may also be capable of performing inter-band FR2 DAPS handover interruption during $D_{handover2}$. For example, if the source and target cell are on different carriers, the UE may need additional time to de-activate or release the appropriate base band resources corresponding to the different carrier of the source cell. More specifically, the UE may be allowed to interrupt the handover during $D_{handover2}$ on the target cell up to a maximum value of $T_{interrupt2}$. For example, for the case in which numerology μ=2 and the corresponding NR slot length of the target cell is 0.25 ms, $T_{interrupt2}$ may be characterized by $T_{interrupt2}=4$ for the synchronous case and $T_{interrupt2}=4+x$ for the asynchronous case. In another example in which numerology μ=3 and the corresponding NR slot length of the target cell is 0.125 ms, $T_{interrupt2}$ may be characterized by $T_{interrupt2}=8$ for the synchronous case and $T_{interrupt2}=8+x$ for the asynchronous case. Furthermore, in the asynchronous case, the value X may again typically correspond to a value of 1 slot but in some embodiments may also be a value larger than 1.

In some embodiments, the UE may be capable of performing Intra-band FR2 DAPS handover interruption. Moreover, when performing Intra-band handovers, the UE may need time to adjust its automatic gain control (AGC) levels for the Intra-band FR2 DAPS handover to better receive the downlink data from the source and target cells. Additionally or alternatively, the UE may also require time to activate the appropriate base band resources corresponding to possible different carriers of the source and target cells. More specifically, during $D_{handover1}$, the UE may be allowed to interrupt the handover on the source cell up to a maximum value of $T_{interrupt1}$. For example, for the case in which numerology μ=2 and the corresponding NR slot length of the target cell is 0.25 ms, $T_{interrupt1}$ may be characterized by $T_{interrupt1}=4+T_{SMTC\_duration}$ for the synchronous case and $T_{interrupt1}=4+T_{SMTC\_duration}+x$ for the asynchronous case where $T_{SMTC\_duration}$ may be defined as the time duration for a SSB-Based RRM Measurement Timing. In another example in which numerology µ=3 and the corresponding NR slot length of the target cell is 0.125 ms, $T_{interrupt1}$ may be characterized by $T_{interrupt1}=8+T_{SMTC\_duration}$ for the synchronous case and $T_{interrupt1}=8+T_{SMTC\_duration}+x$ for the asynchronous case. Furthermore, in the asynchronous cases, the value X may again typically correspond to a value of 1 slot but may also be a value larger than 1, according to some embodiments.

In some embodiments, the UE may also be capable of performing Intra-band FR2 DAPS handover interruption during $D_{handover2}$. More specifically, the UE may be allowed to interrupt the handover during $D_{handover2}$ on the target cell up to a maximum value of $T_{interrupt2}$. For example, for the case in which numerology µ=2 and the corresponding NR slot length of the target cell is 0.25 ms, $T_{interrupt2}$ may be characterized by $T_{interrupt2}=4+T_{SMTC\_duration}$ for the synchronous case and $T_{interrupt2}=4+T_{SMTC\_duration}+x$ for the asynchronous case. In another example in which numerology µ=3 and the corresponding NR slot length of the target cell is 0.125 ms, $T_{interrupt2}$ may be characterized by $T_{interrupt2}=8+T_{SMTC\_duration}$ for the synchronous case and $T_{interrupt2}=8+T_{SMTC\_duration}+x$ for the asynchronous case. Furthermore, in the asynchronous case, the value X may again typically correspond to a value of 1 slot but may also be a value larger than 1, according to some embodiments.

One objective that may be targeted in cellular communication technology developments, potentially including in 3GPP cellular technologies such as LTE and NR, may include reducing any potential interruption time during cell handovers. One approach to meeting this objective may include developing and utilizing DAPS handover techniques in higher frequency ranges such as frequency range 2 (FR2) corresponding to frequencies between 24.25 GHz to 52.6 GHz. To support DAPS handovers between FR2 source and target cells, a UE may need to, similar to previously supported frequency range handovers, keep UL and DL links with both the source cell and the target cell.

There may be numerous possible handover scenarios in which DAPS handover may be used, potentially including any or all of intra-frequency Intra-band handover, inter-frequency handover, synchronous handover, and asynchronous handover. For intra-frequency asynchronous handover, it may be the case that the UE can only transmit on one UL link at a time. If the source cell and the target cell are non-collocated, and the cell radius difference is relatively large, the timing advance difference or gap between the source cell and the target cell could be substantial.

Note that it may be possible, in some instances, that a UE does not report having the capability to support DAPS handover. In such a scenario, fallback to non-DAPS handover may occur, e.g., such that the UE may keep the uplink with the target cell, at least according to some embodiments.

Note also that the techniques described herein may be applied to either or both of NR and LTE DAPS handover, according to various embodiments.

Still another example embodiment may include a device, comprising: an antenna; a radio coupled to the antenna; and a processing element operably coupled to the radio, wherein the device is configured to implement any or all parts of the preceding examples.

Yet another example embodiment may include a method, comprising: by a device: performing any or all parts of the preceding examples.

A further exemplary embodiment may include a non-transitory computer accessible memory medium comprising program instructions which, when executed at a device, cause the device to implement any or all parts of any of the preceding examples.

A still further example embodiment may include a computer program comprising instructions for performing any or all parts of any of the preceding examples.

A yet further example embodiment may include an apparatus comprising means for performing any or all of the elements of any of the preceding examples.

Still another example embodiment may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
   at least one processor configured to cause a user equipment (UE) to:
      transmit, to one or more base stations configured to support one or more cells operating in frequency range 2 (FR2) above 24 GHz, one or more indications of a dual active protocol stack (DAPS) handover capability of the UE corresponding to FR2, wherein the one or more indications further indicate a capability of the UE to support DAPS handover in FR2 with common beam management (CBM) or
independent beam management (IBM);
receive, from a target cell of the one or more cells, a
command to perform a DAPS handover from a
source cell of the one or more cells to the target cell,
and
in response to receiving the command to perform the
DAPS handover:
perform, while maintaining a data connection with
the source cell, measurements on the target cell
during the DAPS handover;
perform a physical random access channel (PRACH)
procedure on the target cell;
receive, after completion of the PRACH procedure,
a source cell release command from the target cell;
and
release, in response to receiving the source cell
release command, the data connection with the
source cell.

2. The apparatus of claim 1, wherein the DAPS handover is performed using one or more independent beams of the one or more base stations.

3. The apparatus of claim 2, wherein the one or more independent beams are collocated at the one or more base stations.

4. The apparatus of claim 2, wherein the one or more independent beams are non-collocated at the one or more base stations.

5. The apparatus of claim 1, wherein the DAPS handover is performed with a common beam.

6. The apparatus of claim 5, wherein the common beam is collocated at the one or more base stations.

7. The apparatus of claim 1, wherein the DAPS handover capability is indicated per band, per band combination, or per band and per band combination.

8. The apparatus of claim 1, wherein intra-band and inter-band DAPS handovers correspond to maximum receive and transmit timing differences between the source cell and the target cell.

9. The apparatus of claim 1, wherein the DAPS handover has one or more delay times including at least one of a first handover delay and a second handover delay.

10. The apparatus of claim 9, wherein during inter-band and intra-band DAPS handovers, the UE is allowed a first interruption on the source cell during the first handover delay and a second interruption on the target cell during the second handover delay.

11. The apparatus of claim 9, wherein during intra-band DAPS handovers, the UE is allowed a first interruption on the source cell during the first handover delay and a second interruption on the target cell during the second handover delay.

12. A user equipment (UE), comprising:
wireless communication circuitry; and
at least one processor coupled to the wireless communication circuitry and configured to cause the UE to:
transmit, to one or more base stations configured to support one or more cells operating in frequency range 2 (FR2) above 24 GHz, one or more indications of a dual active protocol stack (DAPS) handover capability of the UE corresponding to FR2, wherein the one or more indications further indicate a capability of the UE to support DAPS handover in FR2 with common beam management (CBM) or independent beam management (IBM);
receive, from a target cell of the one or more cells, a command to perform a DAPS handover from a source cell of the one or more cells to the target cell, and
in response to receiving the command to perform the DAPS handover:
perform, while maintaining a data connection with the source cell, measurements on the target cell during the DAPS handover;
perform a physical random access channel (PRACH) procedure on the target cell;
receive, after completion of the PRACH procedure, a source cell release command from the target cell; and
release, in response to receiving the source cell release command, the data connection with the source cell.

13. The UE of claim 12, wherein the DAPS handover is performed using one or more independent beams of the one or more base stations.

14. The UE of claim 12, wherein the DAPS handover is performed with a common beam.

15. The UE of claim 12, wherein the DAPS handover capability is indicated per band, per band combination, or per band and per band combination.

16. The UE of claim 12, wherein the DAPS handover has one or more delay times including at least one of a first handover delay and a second handover delay.

17. The UE of claim 16, wherein during inter-band and intra-band DAPS handovers, the UE is allowed a first interruption on the source cell during the first handover delay and a second interruption on the target cell during the second handover delay.

18. A cellular base station (BS), comprising:
at least one antenna;
at least one radio coupled to the at least one antenna; and
at least one processor coupled to the at least one radio;
wherein the cellular base station is configured to support a target cell operating in frequency range 2 (FR2) above 24 GHz, and wherein the at least one processor is configured to cause the BS to:
receive, from a wireless device, one or more indications of a dual active protocol stack (DAPS) handover capability of the wireless device corresponding to FR2 wherein the one or more indications further indicate a capability of the wireless device to support DAPS handover in FR2 with common beam management (CBM) or independent beam management (IBM);
transmit, to the wireless device, a command to perform a DAPS handover from a source cell operating in the FR to the target cell;
receive, from the wireless device, signaling corresponding to a physical random access channel (PRACH) procedure; and
transmit, upon successful completion of the PRACH procedure, a source cell release command to the wireless device,
wherein the source cell release command is configured to indicate a release of a data connection between the wireless device and the source cell.

19. The cellular base station of claim 18, wherein the DAPS handover capability is indicated per band, per band combination, or per band and per band combination.

20. The cellular base station of claim 18, wherein the DAPS handover has one or more delay times including at least one of a first handover delay and a second handover delay.

\* \* \* \* \*